Figure 1:
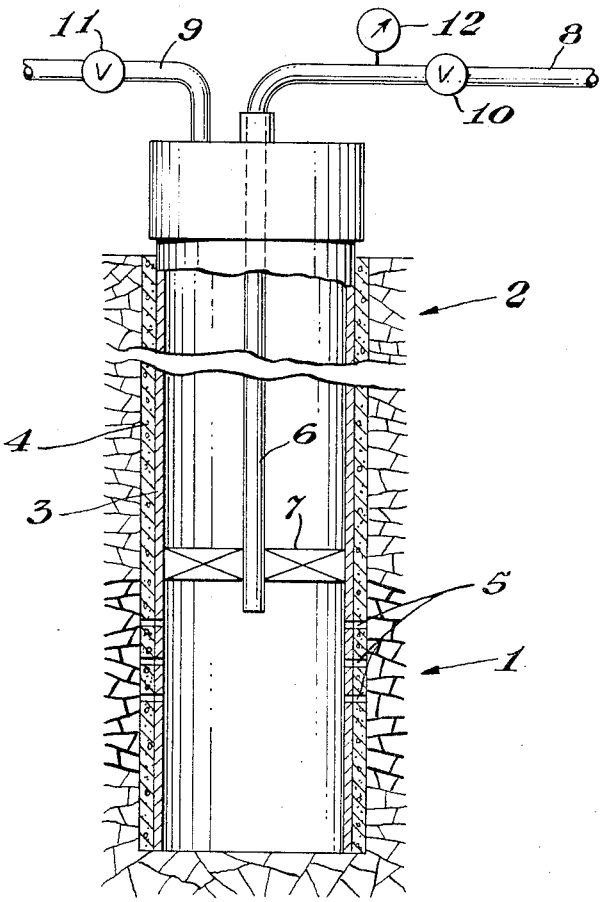

June 27, 1967  W. M. AYERS  3,327,783
CONSOLIDATION IN INCOMPETENT STRATUM
Filed March 16, 1964

INVENTOR.
William M. Ayers
BY
ATTORNEY ously interfere with fluid production than heretofore known methods commonly in use.

3,327,783
CONSOLIDATION IN INCOMPETENT STRATUM
William M. Ayers, Tulsa, Okla., assignor to The Dow Chemical Company, Midland, Mich., a corporation of Delaware
Filed Mar. 16, 1964, Ser. No. 351,910
5 Claims. (Cl. 166—33)

The invention relates to a method of treating an earthen, terranean, or subterranean formation. It more particularly relates to a method of treating an incompetent fluid-bearing stratum of such formation. Fluids of economic significance, e.g. water, brines, gas, and oil, and naturally potable water, are produced from subterranean strata. Usually such fluids are obtained by drilling a well into such stratum and providing an upward flow in the well by applied pressure on the fluid in place.

Wells for the production of fluids sometimes are drilled into or through one or more strata which are referred to as being incompetent or unconsolidated to the extent that production from such strata result in loose particles being removed therefrom and carried by the produced fluid into the well causing production difficulties and interferring with the economical and efficient operation of the well. Among such difficulties are filling up of the wellbore and restricting or stopping production; the undesirable abrasive action of such particles on the pumps, valves, pipes, and the like; accumulation in the well-working equipment of such particles resulting in impairment of operation; and the contamination of the fluid being produced by such particles thereby limiting the use of the fluid and/or requiring further treatment of the fluid before its general acceptance on the market.

Attempts have been made to lessen the severity of the effects of loosened earthen particles being carried from a producing stratum into the wellbore or into the well-working equipment, among which are the injection of cementitious material into the incompetent stratum for the purpose of bonding particles thereof together and the use of cylindrical screens about the base of the wellbore with or without the additional use of gravel or the like for the purpose of screening or filtering out the undesirable earthen particles.

Although some beneficial results have been realized by the use of resinous materials, screen, gravel, and the like in such manner under certain conditions, they have not been fully satisfactory for use in wells in some producing formations and, in general, have not completely met the needs of the oil-producing industry.

It is an object of the invention to provide an improved method of reducing or preventing the entrance of earthen particles from a fluid-bearing formation into the wellbore of a well penetrating the formation.

The manner and means by which this and related objects are attained will be made clear in the ensuing description and are succinctly defined in the appended claims.

The invention is predicated upon the discovery that a judicious selection of a particulate or granular packing material of a specified grain size and injected or emplaced into an incompetent stratum or stata of an earthen formation at controlled pressures to the extent that such particulate or granular material is forced firmly against or in contact with the exposed face of the incompetent strata disposed toward the wellbore, at less than fracturing pressure, followed by injection or emplacement of a liquid resinous material, also at less than fracturing pressure, which is settable to a fluid-permeable solid mass in situ, lessens more effectively the tendency of earthen particles from such incompetent strata to enter the wellbore or otherwise interfere with fluid production than heretofore known methods commonly in use.

The term injecting, as used herein, means emplacing or positioning by forcing the packing material into place followed by forcing the resinous composition into place in any desired way, e.g. pouring, dumping or direct application of air pressure.

It is understood that the packing composition is restrained or retained in place until the resinous material has been injected or emplaced. This may be accomplished by any known technique of applying some restraining force on the packing material until the resinous material is brought into contact with the exposed face thereof and includes continued pressure, shoring and the like. When injecting down a well, merely closing in the well during any lapse of time between emplacement of packing material and resinous composition is satisfactory.

Similarly, the resinous composition, following its emplacement, is retained substantially as emplaced until it has set sufficiently to resist movement.

Although the practice of the invention is not limited to treating a formation penetrated by a well or to injecting the packing material and resin successively down a well, it is particularly applicable to use in that way.

The packing material employed may be any particulate substantially water-insoluble and oil-insoluble material, having a particle size such that a preponderance of the particles thereof, when in position in contact with the strata, provide an average pore size (interstitial voids in the thus positioned material) which is smaller than the average size of the particles composing the incompetent strata. Sizes between about 60 and 325, usually 60 to about 200 mesh, are most suitable for the packing agent. Fine grain sand, glass beads, resin particles and the like may be used.

The packing material is injected as a slurry in any liquid which is substantially unreactive under the conditions of use. Water, brine, petroleum and fractions thereof are commonly employed. The amount of packing material may be between about 0.1 and about 10 pounds per gallon but is usually between about 0.25 and about 5 pounds per gallon of liquid vehicle.

The embodiment of the invention wherein a stratum penetrated by a well is to be treated will be more clearly understood by reference to the annexed drawing, in which, FIGURE 1 is a schematic view of an incompetent fluid-bearing stratum 1 of a formation penetrated by wellbore 2 which is lined with casing 3, the casing being cemented in place by cement 4. The casing has perforated section 5 positioned at the level of stratum 1 to be treated. Tubing 6 is more or less centrally positioned in casing 3 and extends downwardly to a point just above stratum 1. Packer 7 (of a type commonly used in the well treating art which may be set or released as desired) is shown in set position in the annulus between the casing and the tubing. Pipe 8 is shown leading into the tubing and pipe 9 leading into the annulus between tubing and casing and provided with valve assemblies 10 and 11, respectively, for controlling fluid flow through the respective pipes. Pressure gauge 12 is shown attached to the tubing string for the purpose of ascertaining the injection pressures being used.

Figure 2:
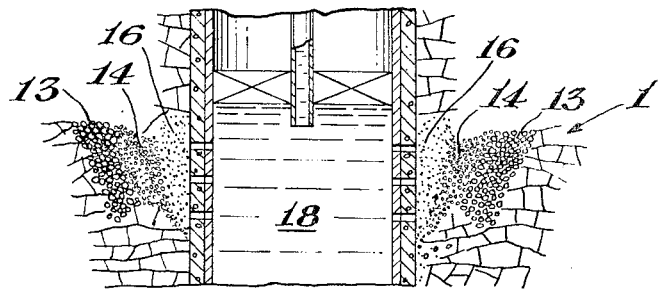

FIGURE 2 is a fragmentary view of a portion of the wellbore penetrating the incompetent stratum showing crumbled away or broken down particles 13 of stratum 1 and, emplaced in contact therewith, the fine particle size bonding material 14 and the mass of fluid-permeable resin 16 (adhered to the exposed surface thereof) which have been forced into the incompetent formation in the vicinity of perforated section 5 by means of displacing liquid 18. Conventional material supply sources, pumping equipment, and power sources (not shown) provide a flow of materials as needed.

Since injection or emplacement of the packing agent and the resin is to be at less than fracturing pressures (i.e. that pressure which would create fractures in the strata being treated), the fracturing pressure of the formation being treated must be ascertained unless it is known from previous treatments of the well now being treated or from the treatment of other wells in the field. Usually, then, any particles of the incompetent formation in the wellbore are removed by circulating brine, water, or oil down the annulus and up the tubing (or by circulating in the reverse direction), packer 7 being open and the valves in lines 8 and 9 adjusted accordingly. The pressure necessary to force the fluid being employed into the stratum is noted. The wellbore is left full of the liquid and the packer then closed.

The fine grained packing agent is injected down the tubing as a slurry in an oil-base, water-base, or emulsion-type liquid. Injection of this slurry is continued until sufficient packing material is placed in contact with the face of the stratum disposed toward the wellbore, such sufficiency being indicated by the injection pressure approaching the known fracturing pressure for the stratum. At this time, the wellbore (both tubing and annulus) is washed free of packing agent which has lodged therein. It is advisable, at this point, to test the formation to ascertain whether or not the formation offers greater resistance to the injection of a fluid thereto than it did prior to emplacement of the packing material. If the resistance to injection thereinto is not appreciably greater than it was prior to the beginning of the treatment, Step 1 of the treatment is repeated. If the resistance to injection thereto is appreciably greater than it was prior to the beginning of the treatment, Step 2 of the treatment, as set out below, is then carried out.

Step 2 consists essentially of injecting down the tubing, while the packer is closed, and the packing material is retained substantially in position in the stratum, a settable resinous composition which is forced against or in contact with the exposed face of the packing material, particularly in the portions thereof which are contiguous to perforated section 5. That portion of the resin remaining inside the tubing at this point is forced into the stratum by prompt injection of a displacing liquid, usually brine or water down the tubing to force substantially all of the remaining resin out through the perforations into the incompetent stratum. The tubing is then usually removed. The well is then shut in during which time the resin sets to a fluid-permeable solid mass. After the resin has set and the well opened, any set resin remaining in the casing may be drilled out.

Any of a number of well known resinous compositions meeting the above requirements may be employed. Illustrative of such resins are epoxy resins, phenol-urea resins, phenol-melamine resins and phenol-aldehyde resins. The resin must be of a nature that it can be retained in a fluid or pumpable state prior to and during injection, be settable as by catalytic action following injection, and be miscible with a suitable diluent to provide porosity (and not a fluid shut-off) in the formation (as a result of separation of diluent) while setting. It also must provide sufficient adhesive and cohesive strengths and resistance to erosion to remain in place during production from the formation.

Among the more acceptable resinous materials to use are the phenol-formaldehyde resins. Such resinous materials are prepared by reacting phenol and formaldehyde in the presence of a suitable catalyst to form a settable resin and thereafter injecting this resin down the wellbore and against the face of the formation in accordance with the invention. As illustrative of a suitable resin for use in the invention is one prepared according to the following procedure: 390 pounds (4.15 moles) of phenol, 506 pounds of 37% by weight formaldehyde (6.24 moles HCHO) and 25 pounds of sodium hydroxide (0.625 mole) are dissolved in 25 pounds of water and mixed together. The total weight of the foregoing mixture is 946 pounds. It has a density, at 80° F., of 9.3 pounds per gallon. The mixture is heated to about 175° F. in a vented jacketed reaction vessel. As the reaction proceeds, cooling water is circulated in the jacket to prevent the reaction mass from becoming hotter than the desired 175° F. As the reaction proceeds the viscosity of the mass increases. After the viscosity has reached about 47 centiposes (measured at 80° F.) the reaction mass is cooled to about 80° F. The resin at this stage is a partially condensed resole type resin. The density at this point is about 9.7 pounds per gallon. This thus cooled mass is then acidified by adding 7.8 gallons of 32% of aqueous HCl (0.6 mole HCl) accompanied by stirring whereby the pH value is reduced to about 5 and the total weight increased to about 1013.5 pounds to give a volume of about 104 gallons. Thereafter the acidified mixture is allowed to stand during which period it separates into two layers. The top layer consists principally of an aqueous sodium chloride solution amounting to about 332.4 pounds having a density of about 9.27 pounds per gallon and a viscosity of about 3 centiposes. This upper layer is discarded. The lower layer consists of about 697.3 pounds of resinous liquid having a density of 10 pounds per gallon and a viscosity measured at 80° F. of 230 centipoises. The liquid resin so made is relatively stable for prolonged periods of time at normal temperature conditions.

This resinous liquid, for use in the practice of the invention, is admixed with a suitable diluent and a catalyst to accelerate the set thereof after injection into the formation are added. Suitable catalysts are any alkali material which will provide sufficient OH ions to induce the set. Suitable diluents are ethyl alcohol, methyl alcohol, and isopropyl alcohol. The amount of diluent to use is usually from about 10% to 75% of the volume of the partially condensed resinous mixture. The purpose of the diluent is largely to cause the resin to set in a fluid-permeable state. This is attained because the diluent forms the continuous phase and the resin the discontinuous phase. The diluent separates as the resin sets, thereby leaving the resin in a strong fluid-permeable network of resin particles.

The time elapsing between the addition of the catalyst to the resin mixture and the hardening thereof varies in accordance with the extent to which condensation was permitted to continue, amount and type of catalyst employed, as well as the temperature of the formation. A suitable setting time can readily be predetermined, about 2 hours being considered ample for most consolidating operations. The following table set forth the number of moles of alkali material, calculated as NaOH, to be used per mole of phenol in the partially condensed resin liquid mixture, employing varying percents of diluent, to produce a gelation of the resin in situ for 2 hours at 140° F. The gelled resin becomes completely hard in about 24 hours, the time for complete hardening being about 10 to 12 times the gelation period.

Table

| Percent by volume diluent used: | Moles of NaOH per mole of phenol |
|---|---|
| 20 | 0.024 |
| 30 | 0.037 |
| 40 | 0.053 |
| 50 | 0.081 |
| 60 | 0.112 |
| 70 | 0.182 |

The amount of resin composition to employ in the practice of the invention depends upon the nature of the stratum being treated and the area of the face of the emplaced packing material. A sufficient amount of the resinous liquid to provide at least an average of two inches in thickness of the set resin in contact with the exposed face of the emplaced packing material.

The following example is illustrative of the practice of the invention. A formation in the High Island field of Texas, having an unconsolidated fluid-bearing stratum therein required treatment. It was penetrated by a well 6,000 feet deep. The well was equipped with casing and tubing and flow control means of the nature of those shown in the drawing. Treatment in accordance with the invention was carried out as follows:

The pressure necessary to fracture the stratum to be treated was known to be 4200 pounds per square inch gauge pressure, hereinafter abbreviated p.s.i.g. A sample of the stratum showed a preponderance of the particles to have a size of between about 100 and 200 mesh (U.S. Bureau of Standards Sieve Series).

A salt water brine was circulated down the tubing and up the annulus to remove any debris and accumulated earthen particles from the wellbore. The wellbore was left full of the brine.

The well tubing was then pulled, equipped with a conventional style packer and 30-foot tail pipe, and reinserted in the well, and the packer set.

Salt water brine, having a specific gravity of 1.1, was then injected down the tubing at less than fracturing pressure to test the receptivity of the stratum to injected fluid. It was found that a pump rate of 1 barrel per minute gave a surface pressure of 975 p.s.i.g. and a calculated formation pressure of 3775 p.s.i.g. Pumping at the rate was maintained for 5 minutes.

Salt water slurry (prepared by using the field brine) with which there had been admixed 0.25 pound of sand per gallon, having grain sizes ranging between about 60 and 80 mesh, was then injected down the tubing at rates varying from 0.88 barrel to 0.5 barrel per minute, during which 1250 gallons of slurry, containing about 300 pounds of 60 to 80 mesh sand, had been injected. The pressure at the surface rose from 975 p.s.i.g. to 1200 p.s.i.g. during the injection of the slurry. The pressure at the stratum being treated, calculated to be 4100 p.s.i.g. (obtained by adding 1200 p.s.i.g. to 2900 p.s.i.g. due to the hydraulic head; the frictional resistance to movement down the tubing was disregarded). The injection was stopped at this pressure so as not to exceed the fracturing pressure.

Packing material remaining in the wellbore was then removed by releasing the packer and circulating brine down the annulus and out the tubing. The packer was then reset.

Salt water brine was then injected down the tubing at the rate of 0.5 barrel per minute as a test to ascertain the extent to which the packing material had been forced into the incompetent stratum. The test showed that the pressure necessary to inject fluid had remained at the same value as that existing at the beginning of the injection of the packing material, and that the stratum remained porous.

The packer was released and diesel oil was then injected down the tubing and forced up the annulus to the extent necessary to remove brine until that in the tubing and below the packer had been displaced by the oil. The packer was then reset and diesel oil continued to be injected down the tubing and forced into the formation to re-establish pressure. 10 barrels of diesel oil were thus used.

300 gallons of partially condensed liquid phenol-formaldehyde resin, according to the procedure described above, was prepared and injected down the tubing followed by diesel oil which forced a substantial portion of the resin into the formation.

Thereafter, additional diesel oil was injected down the tubing (making a total of 600 gallons of diesel oil in all) thereby displacing substantially all the liquid resin into the formation in firm contact with the packing material where it formed a cohesive mass over the exposed face of the packing material.

The well was then shut in for 36 hours during which the resin set to a strong, but fluid-permeable, consolidated network.

The well was then put back into operation. Produced oil from the formation so treated showed only negligible amounts of sand or bits of earth from the unconsolidated stratum.

A larger number of other successful consolidation treatments were performed according to the invention employing fine particle sand of between about 60 and about 200 mesh as the packing agent, various thermosetting resins, and petroleum oils and fractions thereof as the carrier fluid in accordance with the invention. Evaluation of all treatments performed in accordance with the invention showed that when fracturing pressures were not exceeded, 88.8 percent of the treatments were successful. Where the fracturing pressures were equaled, less than 74 percent of the treatments were successful and where the fracturing pressures were exceeded, less than 51 percent of the treatments were successful.

Having described my invention, what I claim and desire to protect by Letters Patent is:

1. The method of treating an incompetent stratum of a subterranean formation to provide a consolidated fluid-permeable zone in the stratum in the vicinity of the wellbore, the stratum being penetrated by a wellbore provided with a tubing and a packer positioned in the annulus between the tubing and wellbore wall at a level above the stratum to be treated, which comprises the steps of:

(a) ascertaining the pressure at which the formation at the level to be treated would fracture;
   (b) injecting down the tubing, at less than the pressure which would result in fracturing the stratum, a slurry comprising finely divided mineral solids having a particle size which is not substantially larger than the average size of the particles of the formation and such that, when packed in a mass, have average interstitial voids among the particles which is less than the average size of the particles of the incompetent formation, and a liquid vehicle in an amount of between about 0.1 and 10.0 pounds of said solids per gallon of liquid vehicle;
   (c) discontinuing injection of the finely divided mineral solids when the pressure necessary for injection thereof rises appreciably approaching but not reaching fracturing pressure flushing out residual slurry from the wellbore while retaining the packing material in place;
   (d) injecting down the tubing at less than the pressure which would result in fracturing the stratum, a liquid resin composition consisting essentially of an organic carrier liquid and a settable resin dispersed therein selected from the class consisting of epoxy resins, phenol-urea resins, phenol-melamine resins, and phenol-aldehyde resins, and a catalyst to accelerate the set of the resin portion of said composition in the stratum;
   (e) injecting at less than fracturing pressure a liquid selected from water, brine, crude petroleum, and petroleum fractions and blends thereof, down the tubing to displace the resin from the wellbore into the stratum;
   (f) restraining the resin in position until it has set sufficiently to withstand removal by pressures in the formation in the direction of the wellbore.

2. The method according to claim 1 wherein the flushing liquid of step (b) is selected from the class consisting of brine and water and is followed by filling the wellbore with a liquid selected from the class consisting of crude petroleum and fractions and blends thereof prior to injection of the liquid resin composition.

3. The method according to claim 1 wherein the mineral solids are finely divided sand.

4. The method according to claim 1 wherein the resin is an epoxy resin containing a curing agent therefor.

5. The method according to claim 1 wherein the resin composition is partially condensed phenol-formaldehyde resin dispersed in an aliphatic alcohol and containing an alkaline catalyst to accelerate the set of the resin.

References Cited

UNITED STATES PATENTS

| 2,573,690 | 11/1951 | Cardwell et al. | 166—33 |
| 2,674,322 | 4/1954 | Cardwell | 166—33 X |
| 2,815,815 | 12/1957 | Hower et al. | 166—33 |
| 3,100,527 | 8/1963 | Hilton et al. | 166—33 |
| 3,209,826 | 10/1965 | Young | 166—33 |

CHARLES E. O'CONNELL, *Primary Examiner.*

S. J. NOVOSAD, *Assistant Examiner.*